United States Patent
Fisher, Jr.

(10) Patent No.: US 10,346,886 B2
(45) Date of Patent: Jul. 9, 2019

(54) HIERARCHICAL RESALE SYSTEM FOR TELECOMMUNICATION PRODUCTS

(71) Applicant: GENBAND US LLC, Frisco, TX (US)

(72) Inventor: Donald L. Fisher, Jr., Raleigh, NC (US)

(73) Assignee: GENBAND US LLC, Plano, TX (US)

( * ) Notice: Subject to any disclaimer, the term of this patent is extended or adjusted under 35 U.S.C. 154(b) by 295 days.

(21) Appl. No.: 14/305,589

(22) Filed: Jun. 16, 2014

(65) Prior Publication Data

US 2015/0363836 A1    Dec. 17, 2015

(51) Int. Cl.
*G06Q 30/02* (2012.01)
*G06Q 10/06* (2012.01)
*G06Q 10/10* (2012.01)

(52) U.S. Cl.
CPC ....... *G06Q 30/0276* (2013.01); *G06Q 10/067* (2013.01); *G06Q 10/107* (2013.01)

(58) Field of Classification Search
CPC .... G06Q 30/00; G06Q 30/02; G06Q 30/0241; G06Q 30/0276; G06F 17/60; H04Q 7/20
USPC .............. 379/202.01; 705/26.1, 64; 709/203; 455/466
See application file for complete search history.

(56) References Cited

U.S. PATENT DOCUMENTS

| | | | | | |
|---|---|---|---|---|---|
| 6,137,873 | A * | 10/2000 | Gilles | ................ | G06Q 30/0601 379/202.01 |
| 8,965,999 | B1 * | 2/2015 | O'Neil | ................ | G06Q 20/123 709/203 |
| 2005/0216421 | A1 * | 9/2005 | Barry | ................. | G06F 11/0709 705/64 |
| 2005/0277430 | A1 * | 12/2005 | Meisl | ..................... | H04L 51/38 455/466 |
| 2009/0125409 | A1 * | 5/2009 | Barton | ................... | G06Q 30/06 705/26.1 |

* cited by examiner

*Primary Examiner* — Marilyn G Macasiano
(74) *Attorney, Agent, or Firm* — Fogarty LLP (57) ABSTRACT

Systems and methods for a hierarchical resale system for telecommunications services are described. In an embodiment, a computerized method for managing events in a hierarchical resale model for telecommunication products may include receiving, via an electronic interface, access information for accessing an event response system of a down-level provider; identifying, using a data processing device, an event requiring a response from the down-level provider; accessing, using a network interface, the event response system of the down-level provider; and generating, using the data processor, an event response for transmission by the event response system of the down-level provider.

14 Claims, 8 Drawing Sheets

HIERARCHICAL RESALE SYSTEM FOR TELECOMMUNICATION PRODUCTS

TECHNICAL FIELD

This disclosure relates generally to telecommunications, and more specifically, to a hierarchical resale system for telecommunications services.

BACKGROUND

The following discussion sets forth the inventors' own knowledge of certain technologies and/or problems associated therewith. Accordingly, this discussion is not an admission of prior art, and it is not an admission of the knowledge available to a person of ordinary skill in the art.

The telecommunication industry continues to grow rapidly, but is becoming increasingly competitive. Most telecommunication companies rely upon a direct sales business model in which the provider advertises and markets telecommunication products directly to end users. Some providers target enterprise customers for bulk purchases of services for enterprise use, but the enterprise and its employees are still the end user of the services. This business model generally requires expensive advertising campaigns and costly employment of direct sales professionals.

A hierarchical resale model may be advantageous. A hierarchical resale system may be organized into levels of resellers and each reseller may wish to appear to be an original equipment manufacturer (OEM) or service provider, and may wish to avoid the appearance of dependence upon any higher level provider. A portal application may facilitate implementation of the hierarchical resale system. The portal may be rebranded by each level of the hierarchy. The portal may provide a variety of functions to providers and the provider's customers. Some functions may be automated, and may be responsive to certain events. One problem with this system is that the automated responses to events, such as emails, SNTP traps, or SIP notification events may originate from the top level provider's server or domain. The domain may be masked, but often, the masked domain will not resolve properly on incoming servers. The incoming servers may reject the event responses because of domain resolution problems.

SUMMARY

Embodiments of a hierarchical resale system and associated methods for hierarchical resale of telecommunication products are presented. In an embodiment, a computerized method for managing events in a hierarchical resale model for telecommunication products may include receiving, via an electronic interface, access information for accessing an event response system of a down-level provider; identifying, using a data processing device, an event requiring a response from the down-level provider; accessing, using a network interface, the event response system of the down-level provider; and generating, using the data processor, an event response for transmission by the event response system of the down-level provider.

The method may further include generating the electronic interface for receiving the access information from the down-level provider. In some cases, receiving the access information may further comprise receiving an internet-accessible address for the event response system of the down-level provider. Additionally or alternatively, receiving the access information may include receiving authentication information for logging onto the event response system of the down-level provider. Also, accessing the event response system of the down-level provider may include logging onto the event response system of the down-level provider.

The method may include transmitting the event response from the event response system of the down-level provider. In some cases, generating the event response may include generating an email for transmission by an SMTP server for the down-level provider.

In another embodiment, a tangible computer-readable storage medium may have program instructions stored thereon that, upon execution by a computer system, cause the computer system to: receive access information for accessing an event response system of a down-level provider; identify an event requiring a response from the down-level provider; access the event response system of the down-level provider; and generate an event response for transmission by the event response system of the down-level provider.

The program instructions may further cause the computer system to generate the electronic interface for receiving the access information from the down-level provider. Receiving the access information may further comprise receiving an internet-accessible address for the event response system of the down-level provider. Additionally or alternatively, receiving the access information may further comprise receiving authentication information for logging onto the event response system of the down-level provider.

Accessing the event response system of the down-level provider may further comprise logging onto the event response system of the down-level provider. The program instructions may further cause the computer system to transmit the event response from the event response system of the down-level provider. Generating the event response may further comprise generating an email for transmission by an SMTP server for the down-level provider.

In another embodiment, a system may include a computer system configured to receive access information for accessing an event response system of a down-level provider; identify an event requiring a response from the down-level provider; access the event response system of the down-level provider; and generate an event response for transmission by the event response system of the down-level provider.

The computer system may be further configured to generate the electronic interface for receiving the access information from the down-level provider. In some cases, receiving the access information may further comprise receiving an internet-accessible address for the event response system of the down-level provider. Additionally or alternatively, receiving the access information may further include receiving authentication information for logging onto the event response system of the down-level provider. Also, accessing the event response system of the down-level provider may include logging onto the event response system of the down-level provider.

The computer system may be further configured to transmit the event response from the event response system of the down-level provider. Moreover, generating the event response may further comprise generating an email for transmission by an SMTP server for the down-level provider.

BRIEF DESCRIPTION OF THE DRAWINGS

Reference will now be made to the accompanying drawings, wherein.

DETAILED DESCRIPTION

Embodiments disclosed herein are directed generally to hierarchical resale of telecommunication products. In an embodiment, the hierarchical resale system allows a provider to leverage a hierarchical resale business model for sale of telecommunication products. In a hierarchical resale business model, the provider may make telecommunication products available to a business partner for resale to lower level business partners, or directly to end users.

For example, a provider of IP-based communication services may allow a partner or reseller to purchase IP-based services and/or products for resale to an enterprise or individual customer. A product may be a service (i.e. VoIP line, voicemail, mobile service, etc.) but may also include device rental fee, support fee, etc. In an embodiment, a product may be mapped to provisionable services across one or more back end systems, or to physical services/warranties, etc., which may exist outside the scope of the portal's ability to enact.

The customer may directly use the IP-based services/products, or may sell the IP-based services to lower level customers. At each level of the hierarchy, the resellers may markup the cost of the services provided to its customers to derive an incremental profit on the sale. A reseller may create their own products based on those they can buy from the level above or based on "non-IP" services they offer. There may be a 1-1 relationship between products at their level and the item from which it is derived provided by the level above, in some embodiments. Higher ratio bundling is also possible (as noted) as well as bundling IP and non-IP services at the same level. In other embodiments, the resellers may bundle the IP-based communication services in custom-defined service bundles for resale. In still a further embodiment, the resellers may bundle their own services along with the IP-based communication services. For example, the resellers may provide support services in addition to the IP-based communication services. Of course, one of ordinary skill will recognize that the present embodiments are not necessarily limited to provision of IP-based communication services, but may be extended to other forms of communication services, including standard telephone services, mobile communication services, and the like.

In order to facilitate the hierarchical resale model, the present embodiments provide systems, methods, and computer operations for implementing the hierarchical resale model. In a particular embodiment, a portal application is hosted by the communication provider and made available to service resale partners to facilitate implementation of the hierarchical model. In a further embodiment, the portal application may also be made available to lower level customers and/or end users. The present embodiments provide methods for rebranding, sometimes referred to as "white labeling" the portal to give the reseller a customized or rebranded virtual store front for resale of the communication services to lower-level customers. By default, a "child" level in the hierarchy may inherit the branding of the "parent" level in the hierarchy. In some embodiments, resellers and, if permitted by the reseller, customers can choose to override this branding of their instance of the portal. Additionally, the portal and associated background functions may automate certain functions associated with purchasing, provisioning, billing, communicating action acknowledgments, etc.

Beneficially, such an embodiment may facilitate implementation of a hierarchical business model for sale and resale of telecommunication products. Each reseller in the hierarchy may be provided with a customizable and individualized storefront, which can be branded for use with its employees and customers. Many of the functions associated with ordering and/or activation of the telecommunication products may be automated, further streamlining the business model. This streamline business model may reduce overhead and advertising costs to the communication provider. Additionally, business processes associated with purchasing, provisioning, billing and the like may be automated for the reseller, which may reduce overhead costs and improved profit margins accordingly.

The term "telecommunications," as used herein, is intended to encompass voice communications or telephony, as well as other forms of communications (e.g., video communications, videoconferencing, instant messaging or IM, Short Messaging Service or SMS, emails, etc.) that may take place electronically, for example, over wireless networks, circuit-switched networks, packet-switched networks, Application Program Interfaces (APIs) or any combination thereof.

The term "enterprise," as used herein, means a company or organization, including, but not limited to, global corporations, small to medium sized businesses (SBMs), universities, non-profit organizations, etc.

Figure 1:
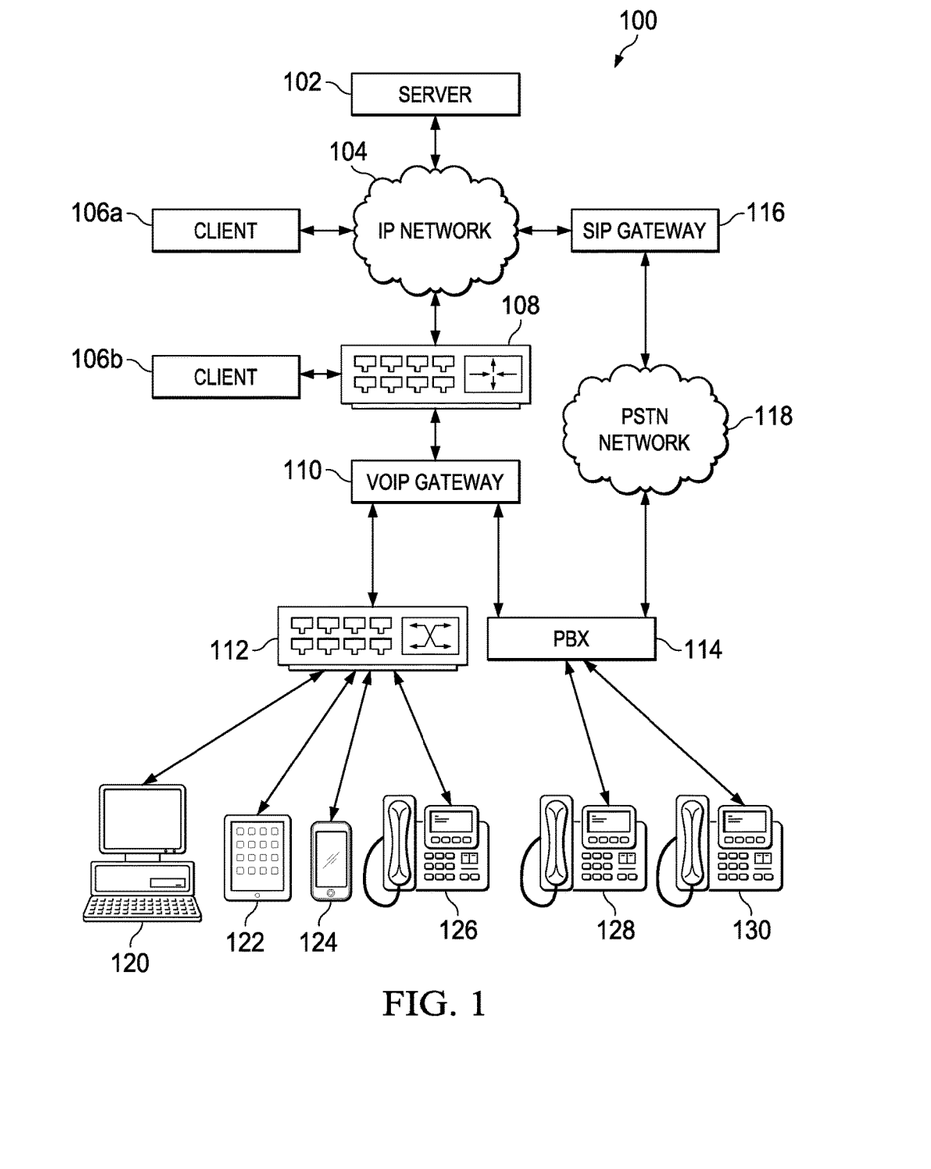
FIG. 1 is a block diagram illustrating one embodiment of a system for hierarchical resale of telecommunication products.

FIG. 1 is a block diagram illustrating one embodiment of a system 100 for hierarchical resale of telecommunication products. The embodiment of FIG. 1 illustrates an example in which a provider provides access to IP-based telecommunication resources to an enterprise customer. The telecommunication products may be provided to the enterprise customer directly in one embodiment. Alternatively, the telecommunication products may be provided by a reseller of the telecommunication products.

In an embodiment, system 100 includes IP network 104 configured to provide telecommunication products. Telecommunication products may include data communications, Voice over IP (VoIP) telephone services, videophone services, messaging, or the like. In an embodiment, system 100 includes server 102 and one or more clients 106a,b configured to communicate with server 102 via IP network 104, or any other suitable network. As described below with reference to FIGS. 4 and 6, server 102 may host a portal application for facilitating management of sale, activation, and subsequent billing for the use of the telecommunication products.

In an embodiment, client 106a may load a version of the portal application hosted by server 102. For example, client 106a may download a web-based portal application from server 102. A telecommunication service reseller may operate client 106a. The enterprise customer may operate client 106b. In an embodiment, the version of the portal application viewed by the enterprise customer on client 106b may be a rebranded version of the original application hosted on server 102. For example, the reseller may change the colors, logos, and other information on the portal application using client 106a, and the rebranded application may be displayed to the enterprise customer on client 106b.

In an embodiment, one or more routers 108 may couple the enterprise local network to IP network 104. Additionally, router 108 may couple client 106b to the IP network 104, and facilitate communication between client 106b and server 102. Additionally, VoIP gateway 110 may be coupled to router 108. VoIP gateway 110 may be configured to provide telephone access to IP network 104 via router 108. In a further embodiment, network traffic switching device 112 may be coupled to VoIP gateway 110, and configured to provide access between VoIP gateway 110 and multiple user interface devices.

Examples of user interface devices include computer workstation 120 configured with a soft phone application, tablet device 122 configured with telephone capabilities, smartphone 124 configured to communicate via IP network 104 according to a VoIP protocol, and/or telephone 126.

In an embodiment, the enterprise local network may include Private Branch Exchange (PBX) 114. One or more telephones 128 may be coupled to PBX 114. PBX 114 may be connected to VoIP gateway 110, either directly or through switch 112. In addition, PBX may be coupled to a Public Switched Telephone Network (PSTN) 118 for providing PSTN telephone services. In an embodiment, devices on IP network 104 may also communicate via PSTN 118 by connecting through Session Initiation Protocol (SIP) gateway 116, or the like.

Figure 2:
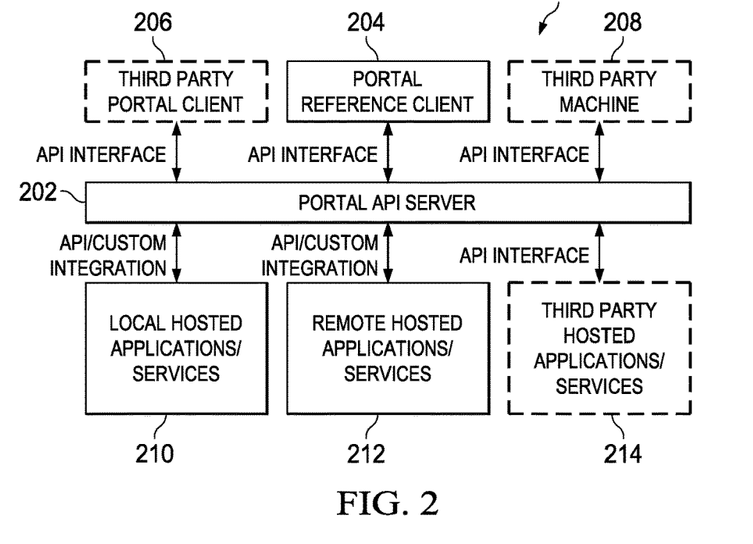
FIG. 2 is a block diagram illustrating an example of another system configured to implement the hierarchical resale of telecommunication products according to some embodiments.

FIG. 2 illustrates an embodiment of system 200, in which functions of the portal application are accessible via portal Application Program Interface (API) server 202. Portal API server 202 may provide access to one or more APIs for use of portal application functionality within a reseller's native software. For example, API interfaces may be provided to portal reference client 204, third party portal client 206, third party machine 208, etc. Additionally, API interfaces or custom integration may be included with locally hosted applications or services 210, remote hosted applications or services 212, or third party hosted applications or services 214. In an embodiment, the API user interface (UI) may be rendered as a web page, complete with HTML, CSS, images and/or JavaScript available via any browser. In a further embodiment, client-specific functions such as customized color schemes and logos, may be made available via the API.

Figure 3:
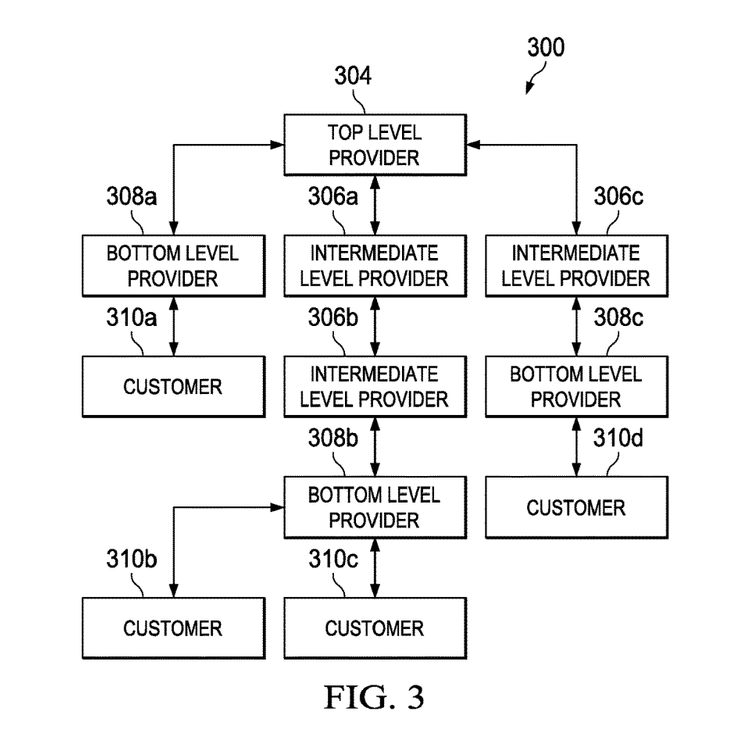
FIG. 3 is a block diagram illustrating another embodiment of a system for hierarchical resale of telecommunication products.

FIG. 3 is a block diagram illustrating an example of yet another system 300 configured to implement the hierarchical resale of telecommunication products. In an embodiment, system 300 may include a carrier network, and communication providers may provide access to the carrier network and other associated services to communication services customers. For example, top level communication provider 304 may manage provisioning of access to the carrier network. In an embodiment, top level communication provider 304 may additionally manage and maintain servers 102 which may be used to host the portal application and facilitate provisioning of access between communication services customer 310b and carrier network 302. In an embodiment, carrier network 302 may be IP network 104. One of ordinary skill will recognize, however, that carrier network 302 may include any one of a variety of communication network types, such as a mobile communication network, and is not limited to the embodiments discussed with relation to FIG. 1.

According to the hierarchical structure, top level communication provider 304 may allow one or more partners or resellers to resell the communication services. For example, top level communication provider 304 may provide communication services to bottom level communication provider 308a, intermediate level communication provider 306a, and/or intermediate level communication provider 306c. In other embodiments, top level communication provider 304 may also provide access directly to a communication services customer.

Additionally or alternatively, bottom level communication provider 308a may provide access to communication services customer 310a. Intermediate level communication provider 306c may provide communication services to communication services customer 310d via bottom level communication provider 308c. Similarly, intermediate level communication provider 306a may resell services to intermediate level communication provider 306b, who may further resell to bottom level communication provider 308b. Bottom level communication provider 308b may additionally resell services to both communication services customers 310b-c. As a person of ordinary skill will recognize in light of this disclosure, a variety of hierarchical structures may be used, which may be driven by partner relationships to the top level communication provider 304 and/or customer relationships.

In an example, top level provider 304 may be a provider of VoIP telephone equipment, software, and services. Bottom level provider 308a may be a reseller of VoIP gateway equipment, and customer 310a may be a company that purchases the VoIP gateway for an IP telephone network. Intermediate level provider 306a may be a reseller of VoIP services. Intermediate provider 306a may resell the services to a second intermediate provider 306b, who may further sell the services to a bottom level provider 306b. Bottom level provider 308b may sell the services to residential customer 310b and/or to enterprise customer 310c. Intermediate provider 306d may resell VoIP software, such as softphones to bottom level provider 308b. Bottom level provider 308d may sell, or otherwise provide the softphone software to its customers 310d. For example, bottom level provider 308b may be a university, and may distribute the softphone application to its students as part of a campus communication system.

Figure 4:
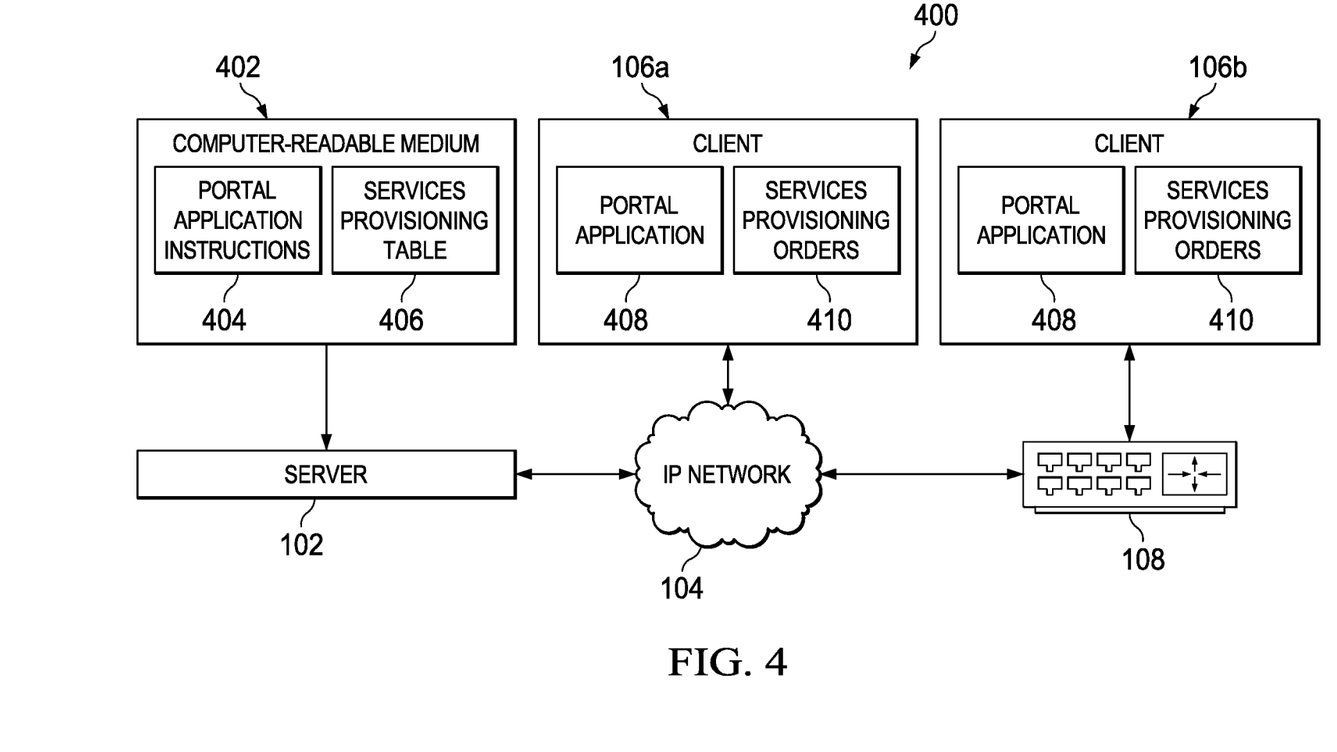
FIG. 4 is a block diagram illustrating another embodiment of a system for hierarchical resale of telecommunication products.

FIG. 4 is a block diagram illustrating an example of computer network 400 configured to implement the hierarchical resale of telecommunication products. In an embodiment, server 102 may be in communication with tangible, non-transitory computer-readable medium 402. For example, computer-readable medium 402 may be a hard disk or memory device that is internal to the server 102. Additionally or alternatively, computer-readable medium 402 may be a hard disk or memory device that is external to server 102, but with which server 102 is configured to communicate. In another embodiment, computer-readable medium 402 may be a removable medium such as an optical storage disk, a removable flash memory device, etc.

In an embodiment, computer-readable medium 402 may include software or computer code which, when loaded in to server 102, cause components of server 102, including the server's processor to operate as special purpose devices according to the instructions provided. In an embodiment, the instructions may include instructions for causing the server to host, manage, or operate portal application 404 for sale and resale of communication services. Additionally, computer-readable medium 402 may include a services provisioning table 406 comprising information regarding the services on carrier network 302 that have been provisioned for communication services customers 310a-d, for example.

In an embodiment, server 102 may be managed or operated by top level communication provider 304. Additionally, client 106a may be operated by bottom level communication provider 308a. In such an embodiment, client 106b may be operated by communication services customer 310a. Alternatively, client 106a may be operated by an intermediate communication provider 306a-c, and client 106b may be operated by a lower level communication provider 308b-c, or by a communication services customer 310b-d.

Each client 106a-b may additionally load a portal application 408. For example, in an embodiment, portal application 408 may be a web application downloaded from server 102. Portal application 408 may comprise all or a portion of portal application instructions 404. Additionally, each client 106a-b may generate one or more services provisioning orders 410 for requesting access to services associated with carrier network 302.

In an example, server 102 may be operated by top level communication provider 304, and may host portal application instructions 404 as well as maintain services provisioning table 406. Bottom level communication provider 308a may contract with top level communication provider 304 to resell communication services under its own brand. Bottom level communication provider 308a may use client 106a to access portal application 408, which is configured to communicate with server 102. Bottom level communication provider 106a may sell communication services to communication services customer 310a. Communication services customer 310a may access portal application 408 using client 106b. Communication services customer 310a may use portal application 408 to submit a services provisioning order 410 to bottom level communication provider 308a. In an embodiment, bottom level communication provider 308a may forward the services provisioning order 410 to server 102 via client 106a. Upon receipt, server 102 may update services provisioning table 406 to reflect the services provisioning order 410. In an alternative embodiment, client 106b may communicate services provisioning orders 410 directly to server 102, and server 102 may communicate information related to the services provisioning orders 410 to bottom level provider 308a at client 106a.

Figure 5:
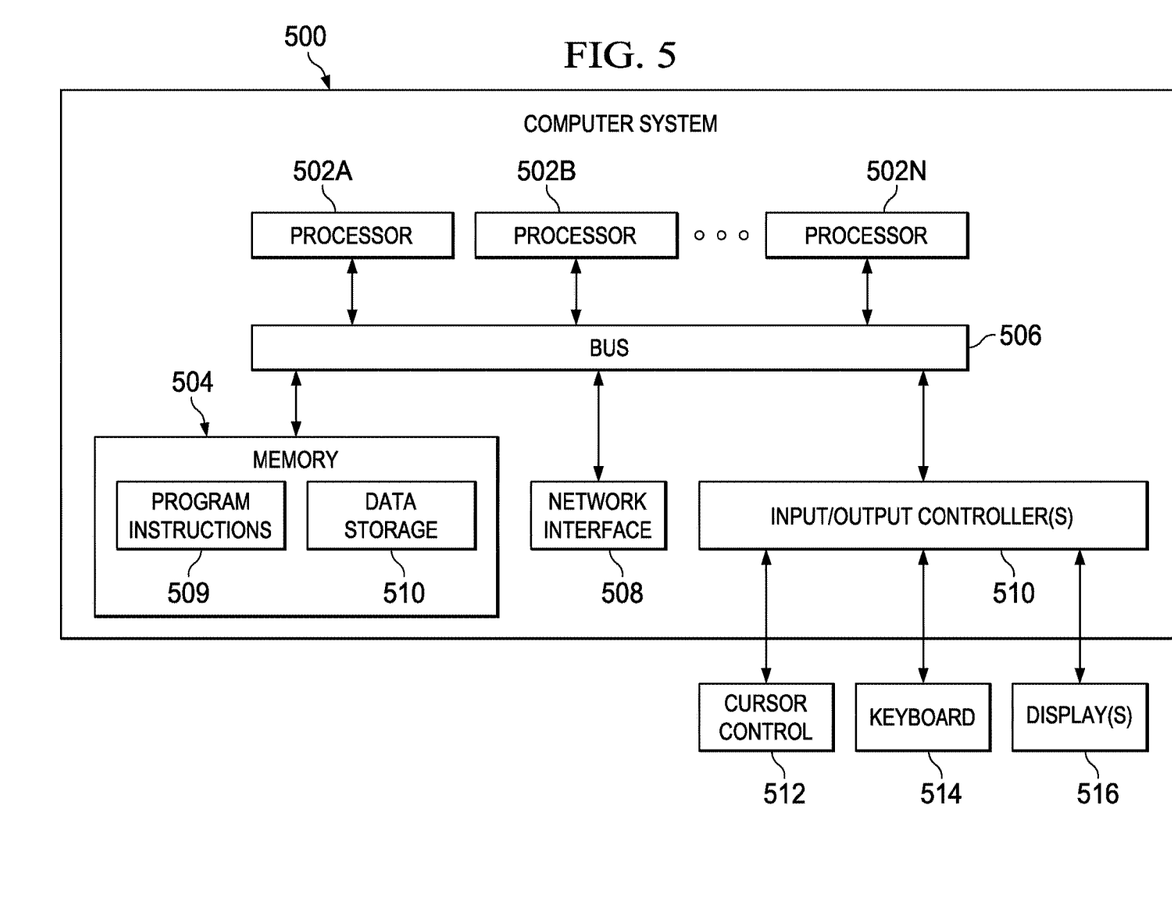
FIG. 5 is a block diagram illustrating another embodiment of a computer system for hierarchical resale of telecommunication products.

FIG. 5 is a block diagram illustrating an example of a computer system configured to implement portal context switching for hierarchical resale of telecommunication products. In an embodiment, server 102 may be implemented on a computer system similar to the computer system 500 described in FIG. 5. In various embodiments, server 500, or any server referred to herein, may be a physical server or a virtualized (i.e., cloud) based instance of a server. Similarly, client 106a may be implemented on a computer system similar to the computer system 500 described in FIG. 5. Client 106b may also be implemented on a computer system similar to the computer system 500. In various embodiments, computer system 500 may be a server, a mainframe computer system, a workstation, a network computer, a desktop computer, a laptop, or the like.

As illustrated, computer system 500 includes one or more processors 502A-N coupled to a system memory 504 via bus 506. Computer system 500 further includes network interface 508 coupled to bus 506, and input/output (I/O) controller(s) 510, coupled to devices such as cursor control device 512, keyboard 514, and display(s) 516. In some embodiments, a given entity (e.g., server 102) may be implemented using a single instance of computer system 500, while in other embodiments multiple such systems, or multiple nodes making up computer system 500, may be configured to host different portions or instances of embodiments (e.g., clients 106a, b).

In various embodiments, computer system 500 may be a single-processor system including one processor 502A, or a multi-processor system including two or more processors 502A-N (e.g., two, four, eight, or another suitable number). Processor(s) 502A-N may be any processor capable of executing program instructions. For example, in various embodiments, processor(s) 502A-N may be general-purpose or embedded processors implementing any of a variety of instruction set architectures (ISAs), such as the x86, POWERPC®, ARMO, SPARC®, or MIPS® ISAs, or any other suitable ISA. In multi-processor systems, each of processor(s) 502A-N may commonly, but not necessarily, implement the same ISA. Also, in some embodiments, at least one processor(s) 502A-N may be a graphics processing unit (GPU) or other dedicated graphics-rendering device.

System memory 504 may be configured to store program instructions and/or data accessible by processor(s) 502A-N. For example, memory 504 may be used to store software program and/or database shown in FIGS. 6-8. In various embodiments, system memory 504 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 504 as program instructions 518 and data storage 520, respectively. In other embodiments, program instructions and/or data may be received, sent or stored upon different types of computer-accessible media or on similar media separate from system memory 504 or computer system 500. Generally speaking, a computer-accessible medium may include any tangible, non-transitory storage media or memory media such as electronic, magnetic, or optical media—e.g., disk or CD/DVD-ROM coupled to computer system 500 via bus 506, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 506 may be configured to coordinate I/O traffic between processor 502, system memory 504, and any peripheral devices including network interface 508 or other peripheral interfaces, connected via I/O controller(s) 510. In some embodiments, bus 506 may perform any necessary protocol, timing or other data transformations to convert data signals from one component (e.g., system memory 504) into a format suitable for use by another component (e.g., processor(s) 502A-N). In some embodiments, bus 506 may include support for devices attached through various types of peripheral buses, such as a variant of the Peripheral Component Interconnect (PCI) bus standard or the Universal Serial Bus (USB) standard, for example. In some embodiments, the operations of bus 506 may be split into two or more separate components, such as a north bridge and a south bridge, for example. In addition, in some embodiments some or all of the operations of bus 506, such as an interface to system memory 504, may be incorporated directly into processor(s) 502A-N.

Network interface 508 may be configured to allow data to be exchanged between computer system 500 and other devices, such as other computer systems attached to IP network 104, for example. In various embodiments, network interface 508 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 510 may, in some embodiments, enable connection to one or more display terminals, keyboards, keypads, touch screens, scanning devices, voice or optical recognition devices, or any other devices suitable for entering or retrieving data by one or more computer system 500. Multiple input/output devices may be present in computer system 500 or may be distributed on various nodes of computer system 500. In some embodiments, similar I/O devices may be separate from computer system 500 and may interact with computer system 500 through a wired or wireless connection, such as over network interface 508.

As shown in FIG. 5, memory 504 may include program instructions 518, configured to implement certain embodiments described herein, and data storage 520, comprising various data accessible by program instructions 518. In an embodiment, program instructions 518 may include software elements of embodiments illustrated in FIGS. 6-8. For example, program instructions 518 may be implemented in various embodiments using any desired programming language, scripting language, or combination of programming languages and/or scripting languages. Data storage 520 may include data that may be used in these embodiments such as, for example, services provisioning table 406. In other embodiments, other or different software elements and data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Embodiments of server 102 and clients 106a, b described in FIGS. 1 and 4 may be implemented in a computer system that is similar to computer system 500. In one embodiment, the elements described in FIG. 6 may be implemented in discrete hardware modules. Alternatively, the elements may be implemented in software-defined modules which are executable by one or more of processors 502A-N, for example.

A person of ordinary skill in the art will appreciate that computer system 500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system or processor-based configurations.

Figure 6:
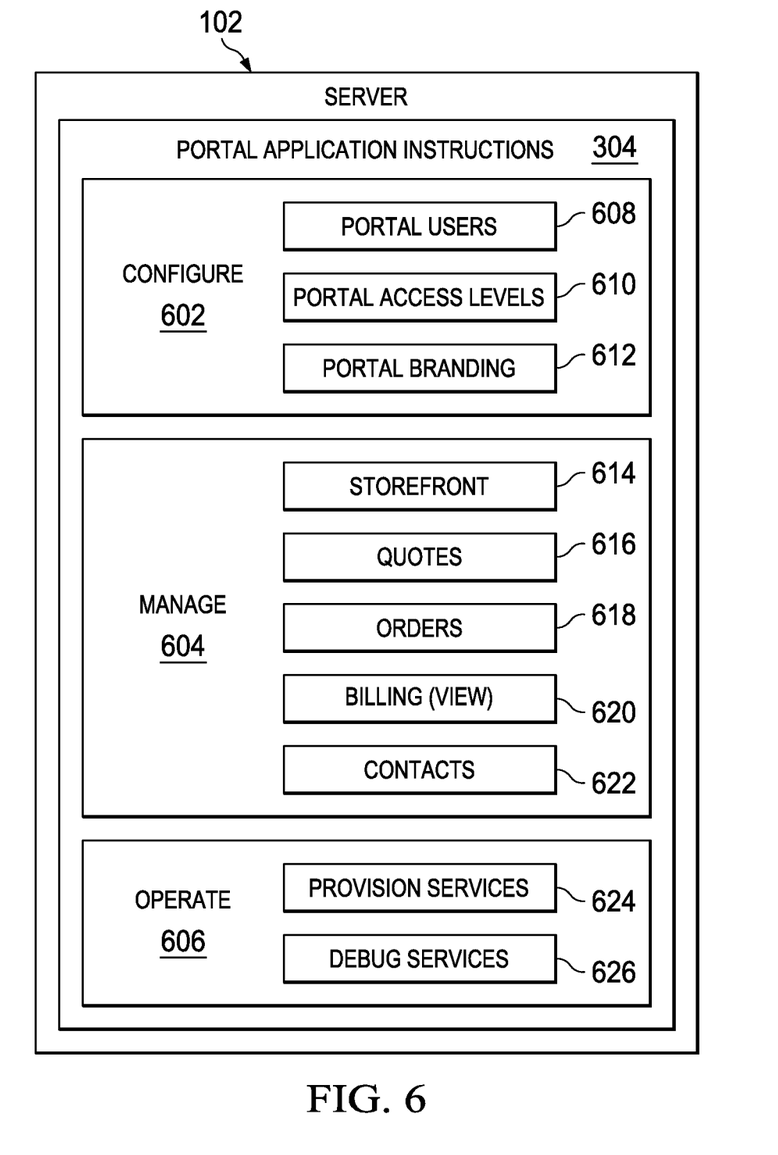
FIG. 6 is a block diagram illustrating one embodiment of an apparatus for hierarchical resale of telecommunication products.

FIG. 6 is a block diagram illustrating an example of portal application instruction modules configured to implement the hierarchical resale of telecommunication products. In an embodiment, server 102 may be configured to operate according to portal application instructions 404. In particular, processor(s) 401A-N may load and operate according to the portal application instructions as a special purpose machine.

In an embodiment, portal application instructions 404 cause server 102 to operate configure unit 602, manage unit 604, and operate unit 606. Each unit 602-606 may include one or more sub-units configured to carry out a specific set of tasks as defined by the portal application instructions 404. For example, configure unit 602 may include portal users configuration unit 608, portal access levels configuration unit 610, and portal branding configuration unit 612. In an embodiment, manage unit 604 may include a virtual storefront management unit 614, quotes management unit 616, orders management unit 618, billing management unit 620, and contacts management unit 622. In an embodiment, operate unit 606 may further include provision service unit 624, and debug services unit 626.

In an embodiment, configure unit 602 and its associated sub-units may be configured to handle portal configuration processes. For example, portal configuration processes may include setting up new users, setting portal access levels, and customizing the portal branding for each reseller. Manage unit 604 may handle receipt, fulfillment, and billing for new service orders, along with other related functions. Operate unit 606 may handle the operations aspects of providing the communication services to the customer. For example, operate unit 606 may handle configuration, provisioning and debugging of products in response to orders or customer support requests.

In an embodiment, portal users configuration unit 608 may be configured to provide an interface for allowing a system administrator to add new portal users. For example, the top level communication provider may use portal users unit 608 to set up bottom level communication provider 308a and intermediate communication providers 306a,c as users of the portal application. The setup process may include operations such as entry of account numbers, login criteria, personal information, contact information, and the like. Likewise, intermediate level communication providers 306a,c may use the portal users configuration unit 508 to add lower level portal users, such as additional intermediate level communication providers 306b, bottom level communication providers 308b,c, and/or communication services customers 310b,d, for example.

Portal access levels configuration unit 610 may be configured to provide an interface for configuring permissions with respect to various API or UI based functions of the portal application. For example, customers may be given access to place orders, view billing, view status updates, and the like. Employee users may be given access to place fulfillment orders to a higher level provider, adjust billing, create communications or acknowledgments, or the like. Additionally, permissions at each level of provider may have different access levels. In an embodiment, top level communication provider 304 may be given access to information associated with all customers and providers in the hierarchy, whereas each intermediate or bottom level partner 308, 310 may only be given access to information associated with customers and providers at a lower level or within its own provider chain. As person of ordinary skill will recognize in light of this disclosure, various other alternative portal access configurations may be used.

Portal branding configuration unit 612 may provide an interface for allowing an intermediate partner 308 or bottom level partner 310 to establish its own portal brand. For example, the color scheme, logos, copyright notices, etc. may be modified to match the individual provider's corporate brand. In some cases, however, the functional framework of the portal may remain unchanged. In a further embodiment, portal branding configuration unit 612 may provide functionality for entering server redirect information, email configuration information, such as SMTP server addresses and authentication, and the like. In such an embodiment, email and network traffic originating from the server 102 may appear as though it is originating from the client 106a,b or from the domain of the reseller.

For example, intermediate level communication provider 306a may create an authenticated email account on a proprietary email server. Intermediate level communication provider 306a may enter the server address and authentication information, such that all email traffic generated by the top level communication provider 304 from the server 102 appear as though it is originating from the intermediate level provider 306a, rather than the top level provider 304.

In still a further embodiment, branding configuration unit 612 may provide an interface where each reseller may create their own products (SKU, description, pricing, etc.) based on those provided by the top level provider. For example, the reseller may bundle one or more sets of several products provided by each respective provider into a single bundled product having a single SKU number. In such an embodiment, the resellers SKU may be mapped with the base SKU numbers of a higher level provider, and subsequently due the hierarchical model, to the products and corresponding SKUs of their supplier's supplier and so on, which may further facilitate automation of ordering and billing processes. For examples, the reseller's SKU may wrap one or more SKUs of the level above. This wrapping is taken into account for billing (i.e., reseller cost), automatic ordering (the system automatically maps reseller products to products at other levels of the reseller/customer hierarchy, when processing an order) as well as during provisioning (while SKUs, at any level, are the item provisioned against subscribers the system automatically breaks these SKUs into the root configurable/provisionable pieces to be activated and prompts the craftsperson to provide the necessary data for each). For example, if a VoIP service is wrapped and re-wrapped across two levels of resellers when it is provisioned against the user the SKU of the re-wrapped service is used but the provisioning system asks for configuration information based on the VoIP service contained within it.

Additionally, branding unit 612 may provide a template 'terms of use' mechanism, which permits each level to specify their branding/trademarks for application to generic terms of use document furthering the illusion that the system is not hierarchical.

In an embodiment, storefront management unit 614 may be configured to provide an interface for managing interactions with customers. For example, advertisements or promotions may be created via storefront management unit 614. Additionally, customized products may be defined, and storefront management unit 614 may generate product catalogs. Order acknowledgment and status updates may be further provided via storefront management unit 614. In an embodiment, certain actions taken by storefront management module 614 may be automated. For example, promotions may be advertised for a predetermined timeframe, and then automatically be removed or reset at the expiration of the predetermined time period. For example, orders may be tagged as 'zero cost' until a target date. The products in the order can be consumed at no monthly charge until the date expires at which point the items are considered as normal cost and appropriately added to the customer's monthly bill. As a matter of management the target date may be changed by the provider at any point up to the point where the target date has expired and the order is now being billed. Separately, discount levels (volume based) and special discounts (% discounts applied for products consumed by a particular customer's customer) may be applied or modified at any time having an immediate effect on future billing.

In an embodiment, quotes management unit 616 may be configured to provide a price quote to a potential communication services customer 310 in response to an inquiry. In some embodiments, quotes management unit 616 may provide an interface for allowing a live agent to enter the quote information. In another embodiment, customer 310 may be provided with a selection menu when submitting the query, and the price quote may be automatically generated in response to the selections entered by customer 310.

Orders management module 618 may be configured to receive orders for communication services from customers. In an embodiment, orders may be communicated to a live agent for handling. Alternatively, orders may be automatically forwarded up a provider chain to the top level communication provider 304 for fulfillment. Optionally, orders may be automatically accepted on a per customer basis. For example, if a reseller has a good relationship with a customer in good standing, all orders from that customer may be automatically accepted without manual intervention. Automation may be set on a per customer basis. Alternatively, all orders stop at each level to be manually accepted. In still other embodiments, orders may be communicated from the customers—e.g., communication services customers 310b,c—to top level communication provider 304. Top level communication provider 304 may then notify the intermediate level providers 306a,b and bottom level provider 308b that the order has been placed. But, in such an embodiment, top level communication provider 304 may handle fulfillment directly rather than waiting for authorization from lower level providers.

In certain embodiments, aspects of the order placement and management process may be automated. For example, forwarding of the order through the provider chain up to the top level provider 304 may be automated. In an embodiment, orders management unit 618 may allow granular control over what is automated and what requires human involvement. When automated at various levels, it may take less time to enter the initial order than it does to traverse three or four levels of administrative hierarchy, and have the order fulfilled. In a further embodiment, an order acceptance and fulfillment may be automated to bypass basic human intervention. Additionally, inventory coverage, which automatically calculates the order a reseller must make to top level provider 304 on receipt of an order from the customer, may be automated. Such an embodiment, may account for both quantities and also the conversion of reseller products to the products offered by the top level communication provider 304. Another feature which may be automated includes inventory assessment, which provides a quick snapshot view for an order management of the cost to fulfill an order from the customer.

In an embodiment, billing management unit 620 may allow providers 304-308 to bill down level customers for services provided. Certain aspects of the billing process may also be automated. For example, once services are provisioned in response to an order, billing management unit 620 may automatically generate an invoice or a billing notice requesting payment for the services. In another embodiment, billing management unit 620 may provide an interface for allowing a customer or a provider to enter the customer's billing information, such as a charge account number, banking information, or the like.

In an embodiment, contacts management unit 622 may be configured to provide an interface for allowing a provider to manage contact information for customers and potential customers. For example, contacts management unit 622 may track address, email, facsimile, telephone, website, and other contact information associated with a customer or potential customer. Additionally, contacts management module 622 may track contact information for up level providers so that the providers that are higher in the chain may be contacted for customer support, technical support, etc.

In an embodiment, services provisioning unit 624 may be configured to generate services provisioning orders 410 for server 102 to use for updating the services provisioning table 406. In an embodiment, provisioning orders may include information used for provisioning the telecommunication products to the customer, including information about the customers communication device, such as its IP address, MAC address, or the like. Additionally, provisioning data may include a list of service options that are supported/requested. Provisioning data may also include identification of a telephone number or extension number to be associated with the customer's telecommunications equipment 120-140.

Debug services unit 626 may be configured to provide information for technical support of the customer. For example, debug services unit 626 may send diagnostic signals to the customers telecommunications equipment 120-140 for ascertaining an operational state of the equipment and intermediate devices, such as router 108, VoIP gateway 110, switch 112, PBX 114, etc. Debug services unit 626 may also provide a technical support interface to a technical support technician for tracking help tickets, obtaining debug information for the network, escalating help tickets, etc.

Figure 7:
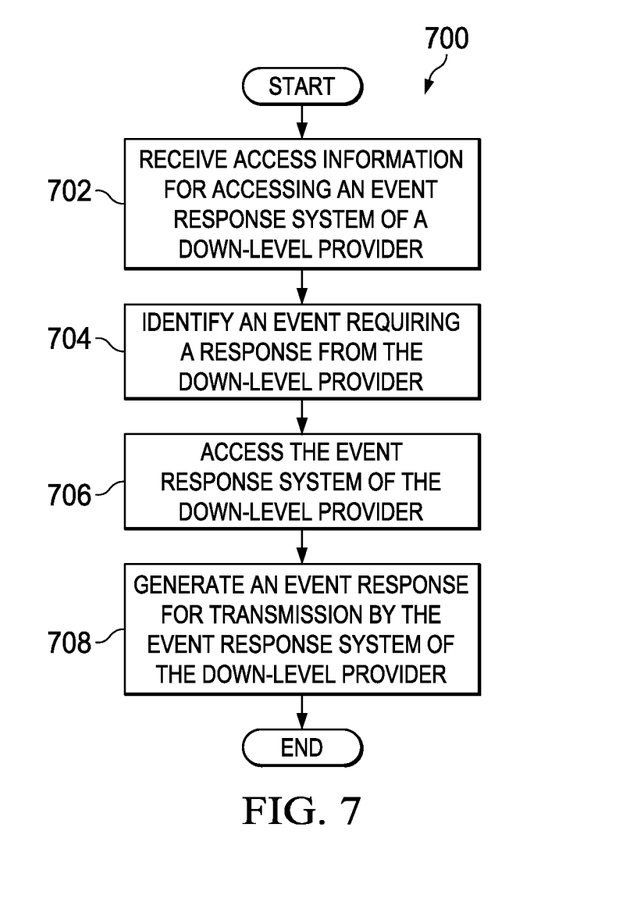
FIG. 7 is a flowchart diagram illustrating one embodiment of a method for managing events in a hierarchical resale model for telecommunication products.

FIG. 7 is a flowchart diagram illustrating one embodiment of a method 700 for managing events in a hierarchical resale model for telecommunication products. In an embodiment, the method 700 starts when the server 102 receives access information for accessing an event response system of a down-level provider as shown at block 702. For example, a down-level provider may be an intermediate level provider 206a-d, or a bottom level provider 108a-c. At block 704, the server may identify an event requiring a response from the down-level provider. For example, an event may include receiving a purchase order, receiving a customer support or technical support request, a failure to connect to end-user equipment, etc. At block 706, the server 102 may access the event response system of the down-level provider. For example, the server 102 may access an SMTP mail server, an SNMP-based network management server, or the like. At block 708, the server 102 may generate an event response for transmission by the event response system of the down-level provider. For example, the server 102 may generate an email for transmission by an SMTP server, an SNMP trap, or the like.

Figure 8:
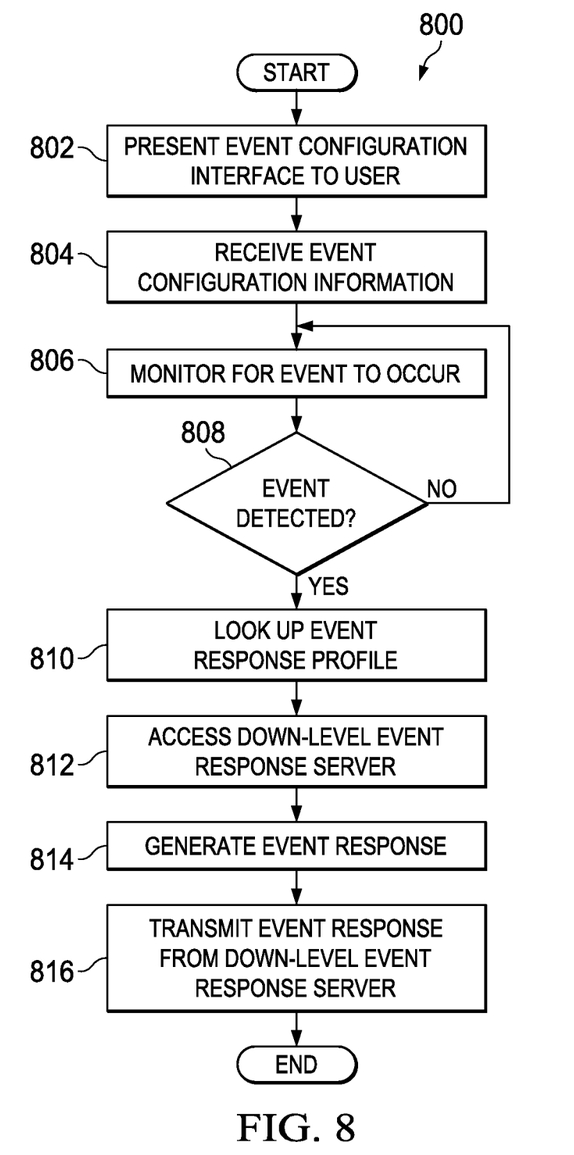
FIG. 8 is a flowchart diagram illustrating another embodiment of a method for managing events in a hierarchical resale model for telecommunication products.

FIG. 8 illustrates another embodiment of a method 800 for managing events in a hierarchical resale model for telecommunication products. In an embodiment, the method 800 states when the server 102 presents an event configuration interface, such as the portal screen illustrated in FIG. 9, to a down-level user as shown at block 802. The user may enter event response configuration information using the portal, and the server 102 may then receive the event configuration information as shown at block 804. Event configuration information may include a correlation of response types to event types. For example, in response to a received purchase order, the server may generate an acknowledgement email to be transmitted through a specified SMTP server. In another example, in response to a detected failure to connect to end-user equipment, the server 102 may generate an SNMP trap to be sent from a specified SNMP server to a designated network management node. The user may enter additional event configuration information, such as a designation of an email address to be used for communications from the server 102, authentication information for logging into the mail server, and the like.

At block 806, the server 102 may monitor for an event to occur. If an event does occur at block 708, then the server 102 may look up an event response profile for the down-level provider as shown at block 810. The event response profile may include event response configuration information received from the down-level provider, including response type, authentication information, etc. At block 812, the server 102 may generate the event response and transmit the response via the down-level event response server as shown at block 814.

Figure 9:
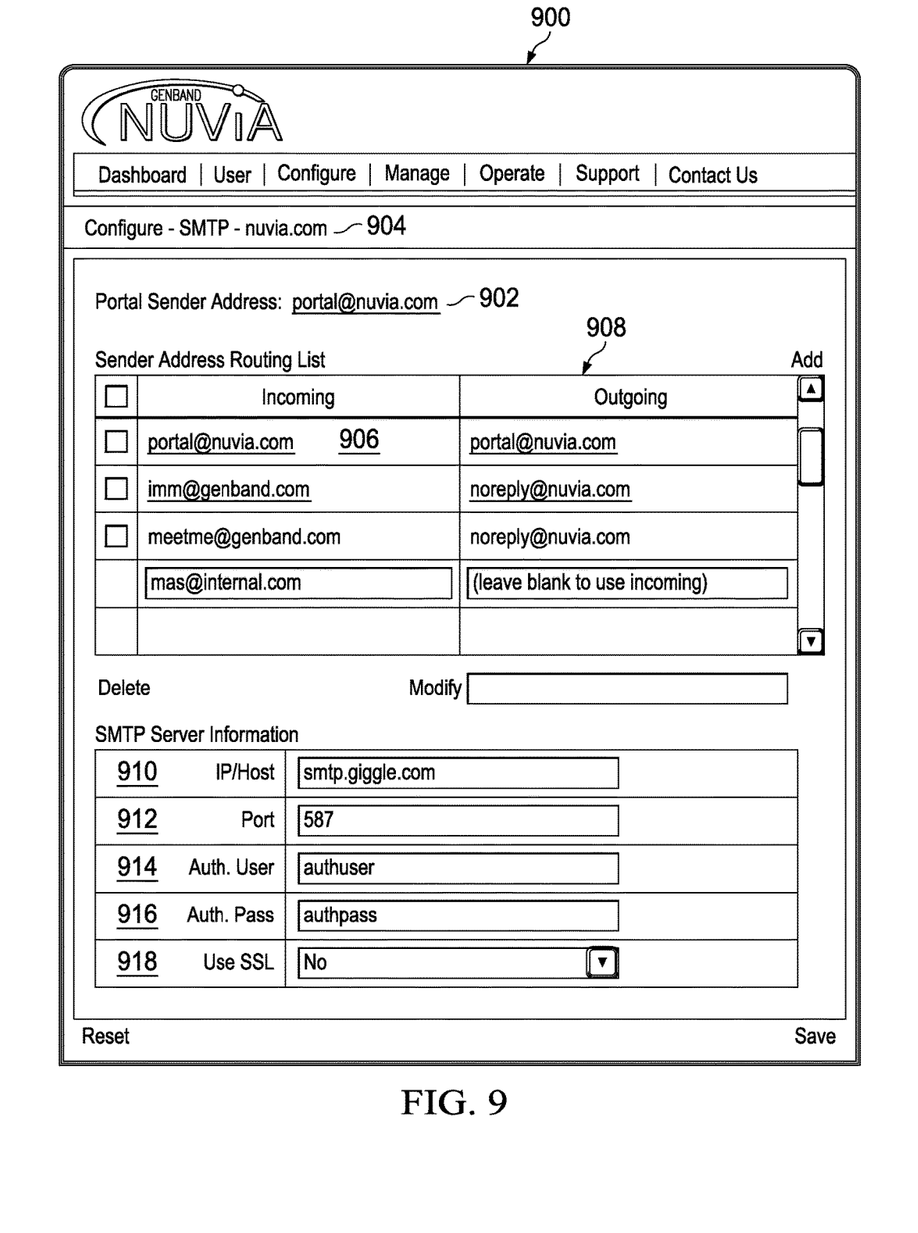
FIG. 9 is a screenshot illustrating one embodiment of an event configuration window in the portal application.

FIG. 9 is a screenshot illustrating one embodiment of an event configuration window 902 in the portal application 308. In an embodiment, the user may be given options for defining the event type 904, for example, an SMTP email message as illustrated in FIG. 9. The user may be able to define a mapping of incoming events 906 to outgoing event responses 908. For example, emails received from addresses on an incoming message list may be responded to using a specified outgoing mail address. The user may then provide directions for contacting the event response server, including a network address, such as a DNS address or IP address for the event response server as shown at field 910. In field 912, the user may enter a port number for contacting the event response server. At fields 912-914, the user may enter authentication information, including a user name at field 912 and a password at field 914. The user may also specify whether the server 102 is to use a Secure Sockets Layer (SSL) connection. One of ordinary skill will recognize that this is only one possible embodiment of the portal event configuration window 902, and that alternative embodiments may be used with the present embodiments.

Although certain embodiments are described herein with reference to specific examples, numerous modifications and changes may be made in light of the foregoing description. Accordingly, the specification and figures are to be regarded in an illustrative rather than a restrictive sense, and all such modifications are intended to be included within their scope. Any benefits, advantages, or solutions to problems that are described herein with regard to specific embodiments are not to be construed as a critical, required, or essential feature or element of any or all the claims. Furthermore, it should be understood that the various operations described herein may be implemented in software, hardware, or a combination thereof. The order in which each operation of a given technique is performed may be changed, and the elements of the systems illustrated herein may be added, reordered, combined, omitted, modified, etc. It is intended that the embodiments described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as "connected" and/or "in communication with," although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A computerized method, comprising:

receiving, via an electronic interface of a higher-level telecommunications product provider, access information usable to allow the higher-level telecommunications provider to log onto a message server of a lower-level telecommunications product provider, wherein the access information comprises authentication information;

identifying, using a data processing device of the higher-level telecommunications product provider, an electronic message originally sent by a customer of the lower-level telecommunications product provider indicating that the customer failed to connect end-user equipment to a telecommunications network, and wherein Simple Network Management Protocol (SNMP) trap messages are sent from the message server to the customer in response to a detected failure to connect to end-user equipment;

logging onto the message server by the higher-level telecommunications product provider; and generating, using the data processing device of the higher-level telecommunications product provider, a response message for transmission by the message server, wherein generating includes, at least in part, looking up an event profile configurable by the lower-level telecommunications product provider that includes a mapping of incoming events to outgoing event responses, and wherein the mapping includes an association between a domain portion of an email address of the lower-level telecommunications product provider and a different a domain portion of a different email address of the higher-level telecommunications product provider.

2. The computerized method of claim 1, further comprising generating the electronic interface for receiving the access information from the lower-level telecommunications product provider.

3. The computerized method of claim 1, wherein receiving the access information further comprises receiving an internet-accessible address for the message server of the lower-level telecommunications product provider.

4. The computerized method of claim 1, wherein generating the response message further comprises generating an email for transmission by the message server.

5. A non-transitory computer-readable storage medium having stored thereon, a set of computer-executable instructions for causing a computer system of a higher-level telecommunications product provider comprising one or more processors to perform steps comprising:

receive, at the computer system of the higher-level telecommunications product provider, access information usable to log onto a message server of a lower-level telecommunications product provider, wherein the access information comprises authentication information;

identify, by the computer system of the higher-level telecommunications product provider, an electronic message originally sent from a customer of the lower-level telecommunications product provider to the message server indicating that the customer failed to connect end-user equipment to a telecommunications network, and wherein Simple Network Management Protocol (SNMP) trap messages are sent from the message server to the customer in response to a detected failure to connect to end-user equipment;

log onto the message server by the higher-level telecommunications product provider; and generate, by the computer system of the higher-level telecommunications product provider, a response message for transmission by the message server of the lower-level telecommunications product provider, wherein generating includes, at least in part, looking up an event profile configurable by the lower-level telecommunications product provider that includes a mapping of incoming events to outgoing event responses, and wherein the mapping includes an association between a domain portion of an email address of the lower-level telecommunications product provider and a different a domain portion of a different email address of the higher-level telecommunications product provider.

6. The non-transitory computer-readable storage medium of claim 5, wherein the program instructions, upon execution by the computer system, further cause the computer system to generate an electronic interface for receiving the access information from the lower-level telecommunications product provider.

7. The non-transitory computer-readable storage medium of claim 5, wherein receiving the access information further comprises receiving an internet-accessible address for the message server of the lower-level telecommunications product provider.

8. The non-transitory computer-readable storage medium of claim 5, wherein receiving the access information further comprises receiving authentication information for logging onto the message server of the lower-level telecommunications product provider.

9. The non-transitory computer-readable storage medium of claim 5, wherein generating the response message further comprises generating an email for transmission by an SMTP server for the lower-level telecommunications product provider.

10. A computer system of a higher-level telecommunications product provider, the computer system comprising:
    a processor; and
    a memory coupled to the processor, the memory having program instructions stored there on that, upon execution by the processor, cause the computer system to:
        receive access information usable by the higher-level telecommunications provider to log onto a message server of a lower-level telecommunications product provider, wherein the access information comprises authentication information;
        identify an electronic message originally sent by a customer of the lower-level telecommunications product provider to the message server indicating that the customer failed to connect end-user equipment to a telecommunications network, and wherein Simple Network Management Protocol (SNMP) trap messages are sent from the message server to the customer in response to a detected failure to connect to end-user equipment;
        log onto the message server by the higher-level telecommunications product provider; and
        generate a response message for transmission by the message server, wherein generating includes, at least in part, looking up an event profile configurable by the lower-level telecommunications product provider that includes a mapping of incoming events to outgoing event responses, and wherein the mapping includes an association between a domain portion of an email address of the lower-level telecommunications product provider and a different a domain portion of a different email address of the higher-level telecommunications product provider.

11. The computer system of claim 10, wherein the program instructions, upon execution by the processor, further cause the computer system to generate the electronic interface for receiving the access information from the lower-level telecommunications product provider.

12. The computer system of claim 10, wherein receiving the access information further comprises receiving an internet-accessible address for the message server of the lower-level telecommunications product provider.

13. The computer system of claim 10, wherein receiving the access information further comprises receiving authentication information for logging onto the message server of the lower-level telecommunications product provider.

14. The computer system of claim 10, wherein generating the response message further comprises generating an email for transmission by an SMTP server for the lower-level telecommunications product provider.

* * * * *